US005847299A

United States Patent [19]

Zovko, Jr. et al.

[11] Patent Number: 5,847,299

[45] Date of Patent: Dec. 8, 1998

[54] SELF-CONTAINED PICK DISPENSER

[75] Inventors: John J. Zovko, Jr.; John J. Zovko, Sr., both of Bethlehem, Pa.

[73] Assignee: John J. Zovko, Bethlehem, Pa.

[21] Appl. No.: 804,799

[22] Filed: Feb. 24, 1997

[51] Int. Cl.[6] .......... G01D 3/00

[52] U.S. Cl. .......... 84/329

[58] Field of Search .......... 84/329, 322; D17/20

[56] References Cited

U.S. PATENT DOCUMENTS

| | | | |
|---|---|---|---|
| 3,181,410 | 5/1965 | Phillips | 84/329 |
| 4,135,431 | 1/1979 | Ferguson | 84/329 |
| 5,231,238 | 7/1993 | Adams | 84/329 |

*Primary Examiner*—Cassandra C. Spyrou

[57] ABSTRACT

A pick dispenser for a solid string musical instrument, such as a guitar, which is a self contained and self functioning unit. The pick dispenser is disposed in a cavity within the solid body of the instrument. The dispenser includes an elevating ramp for lifting the picks to the surface of the dispenser and the instrument for easy grasping of the picks.

1 Claim, 13 Drawing Sheets

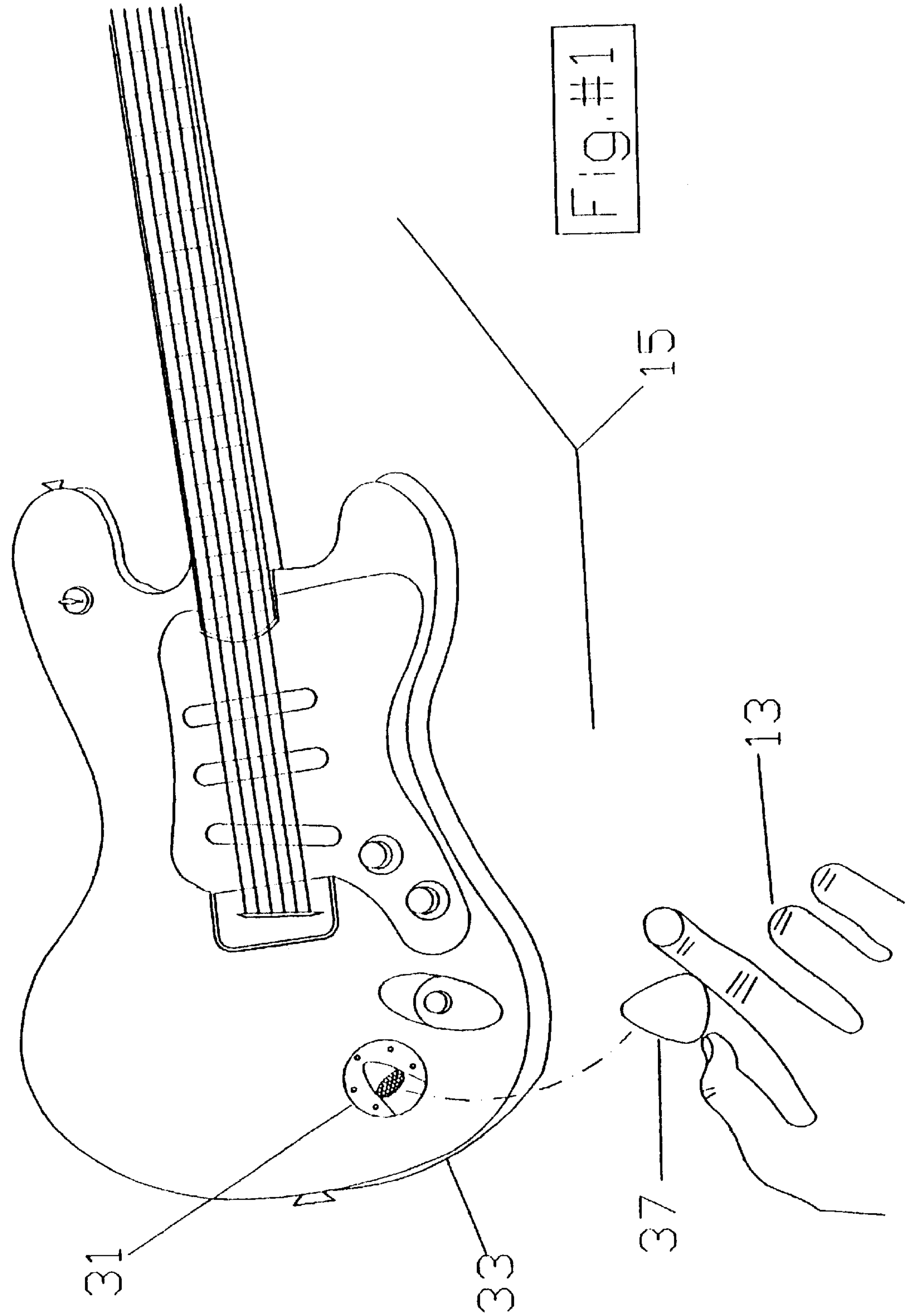
Fig. #1

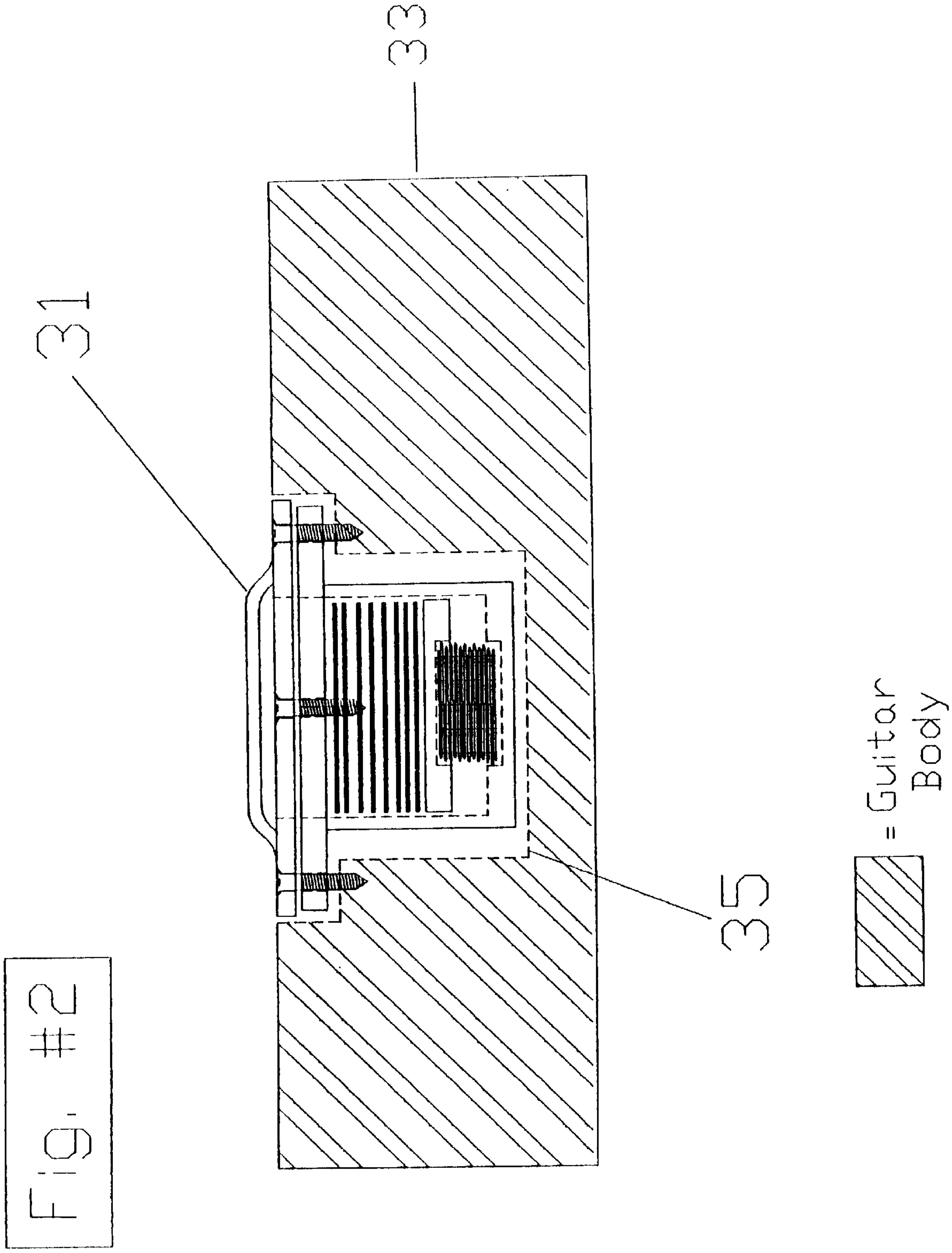
Fig. #2

Fig. # 3
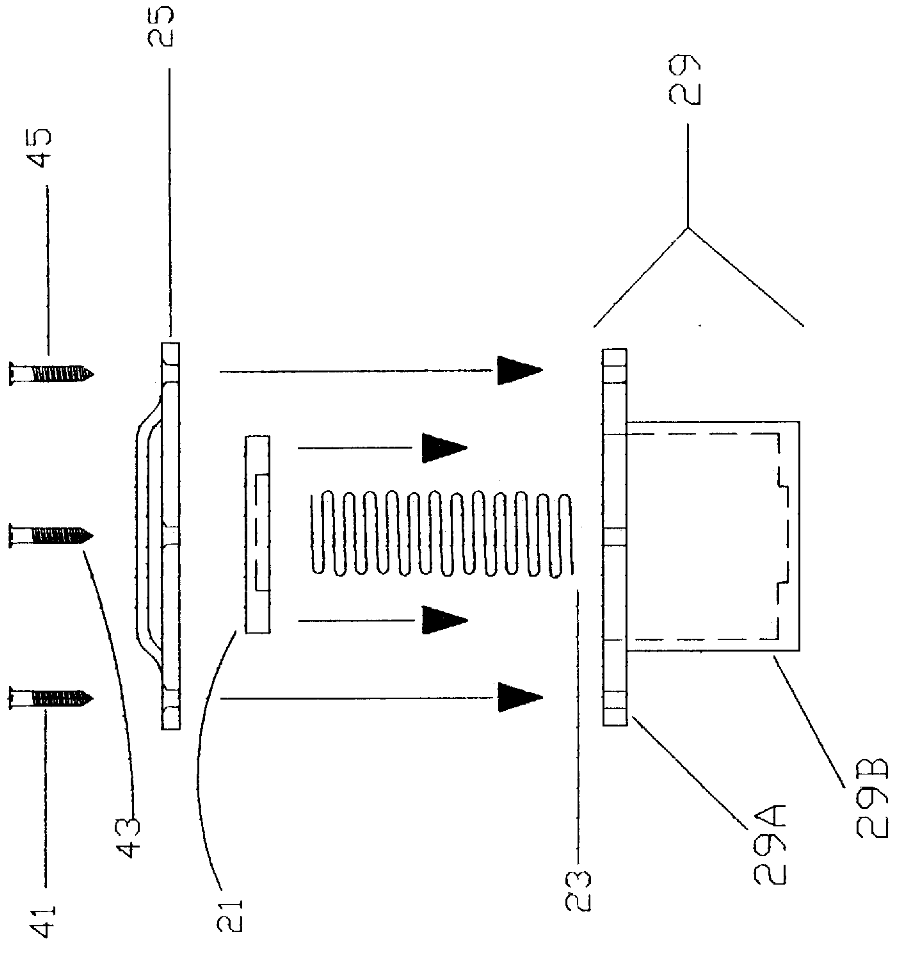

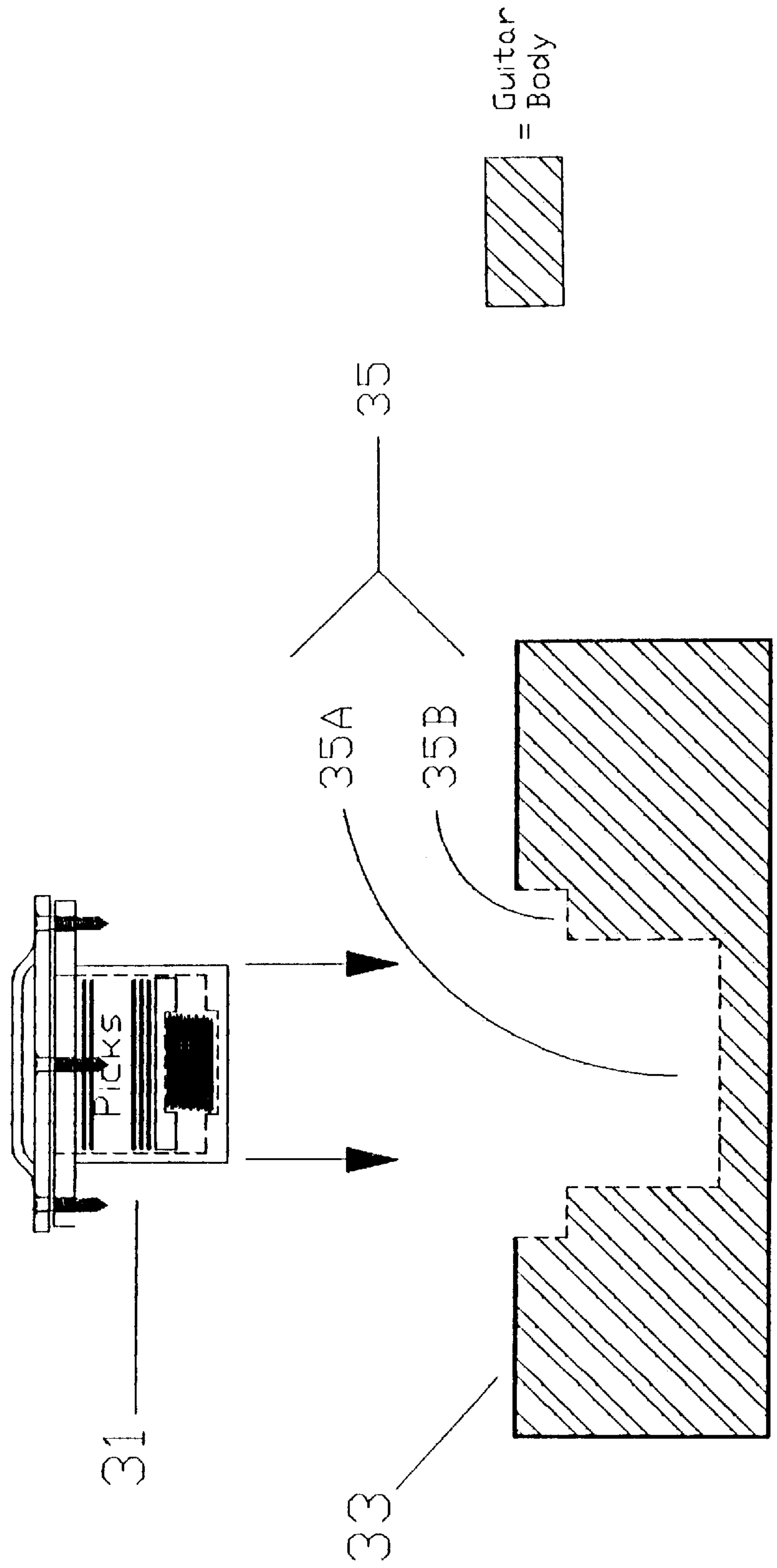
Fig. #4

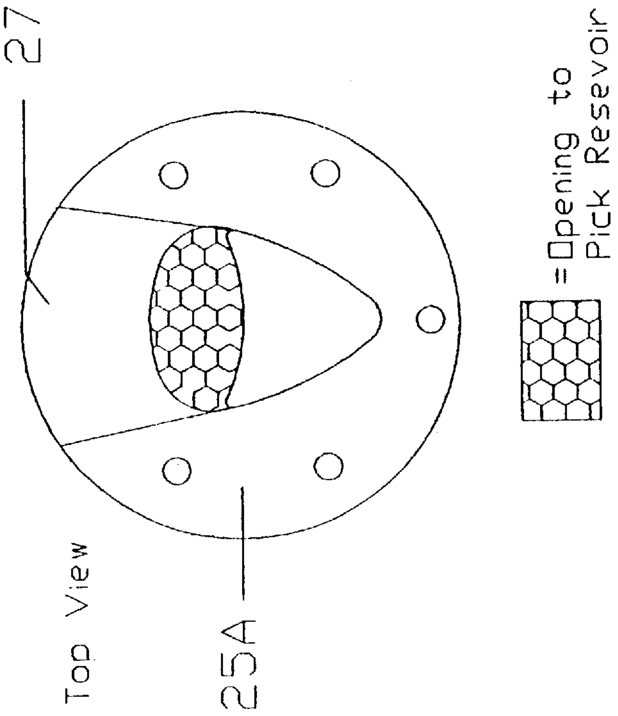
Fig #5

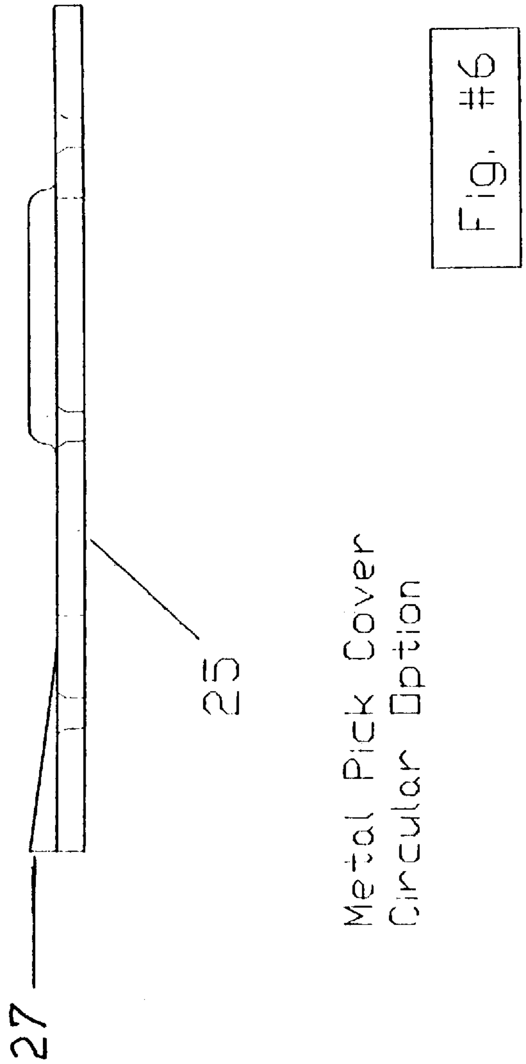
Fig. #6

Fig #7
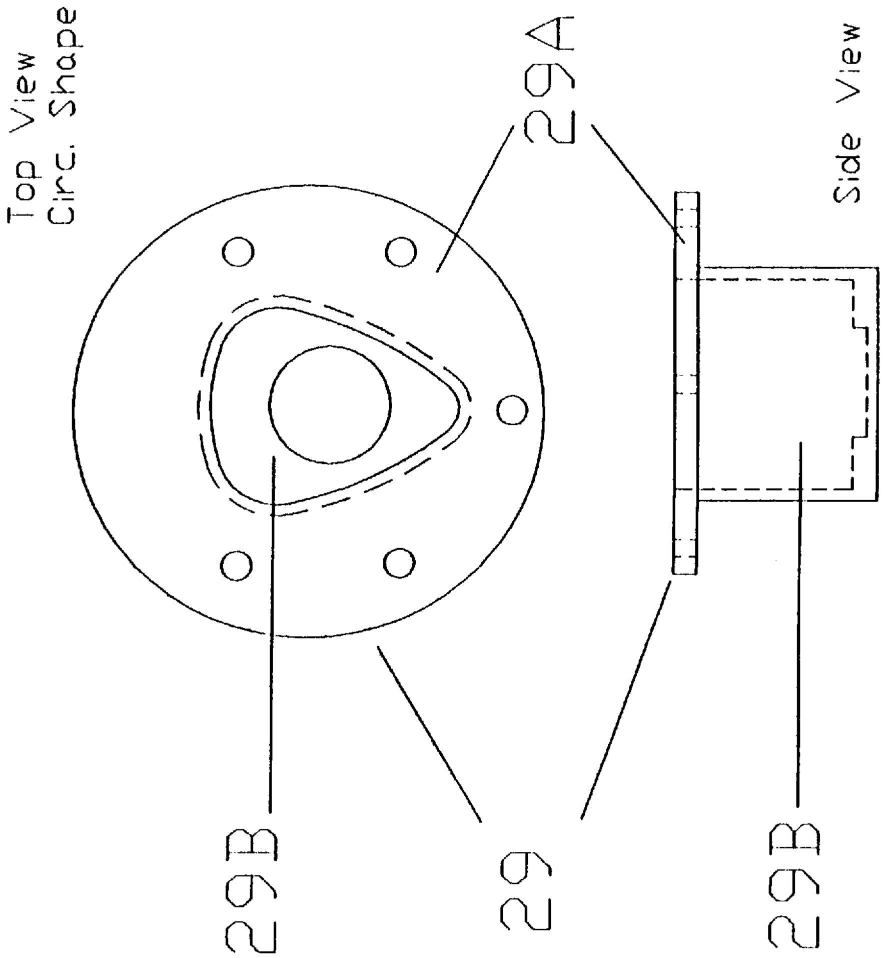

PICK SHAPED PUSHING DEVICE
Fig.#8
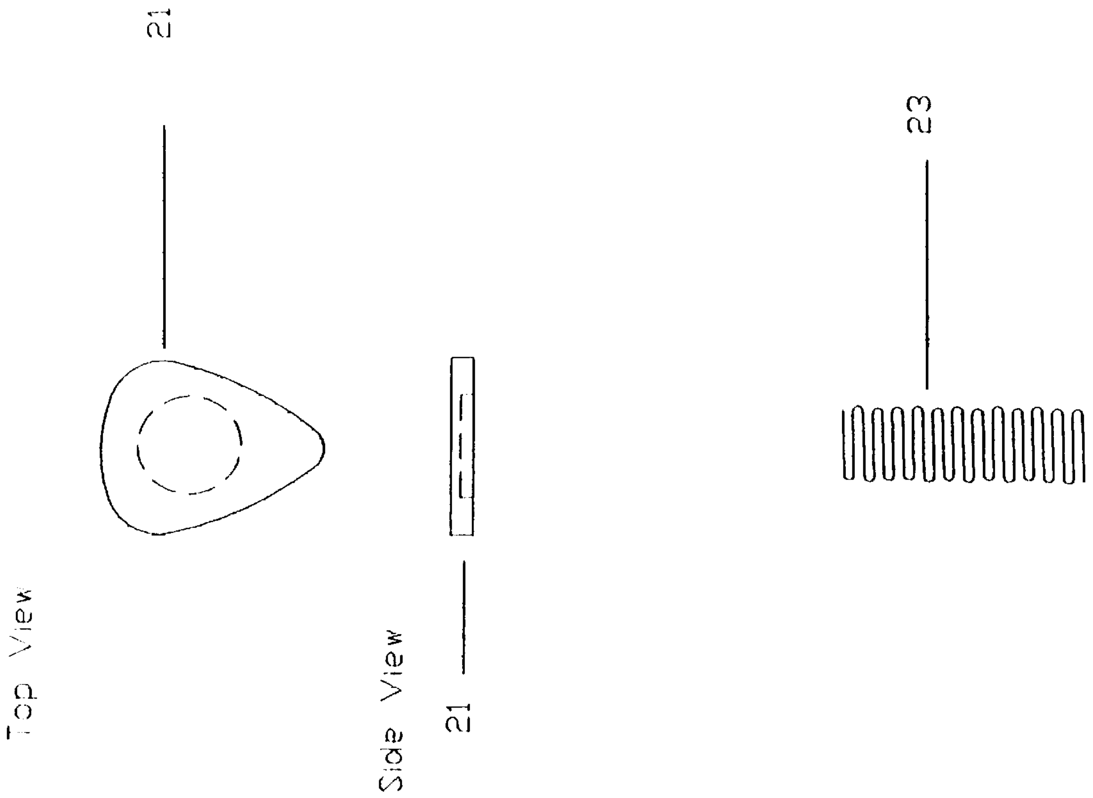

Fig. #9
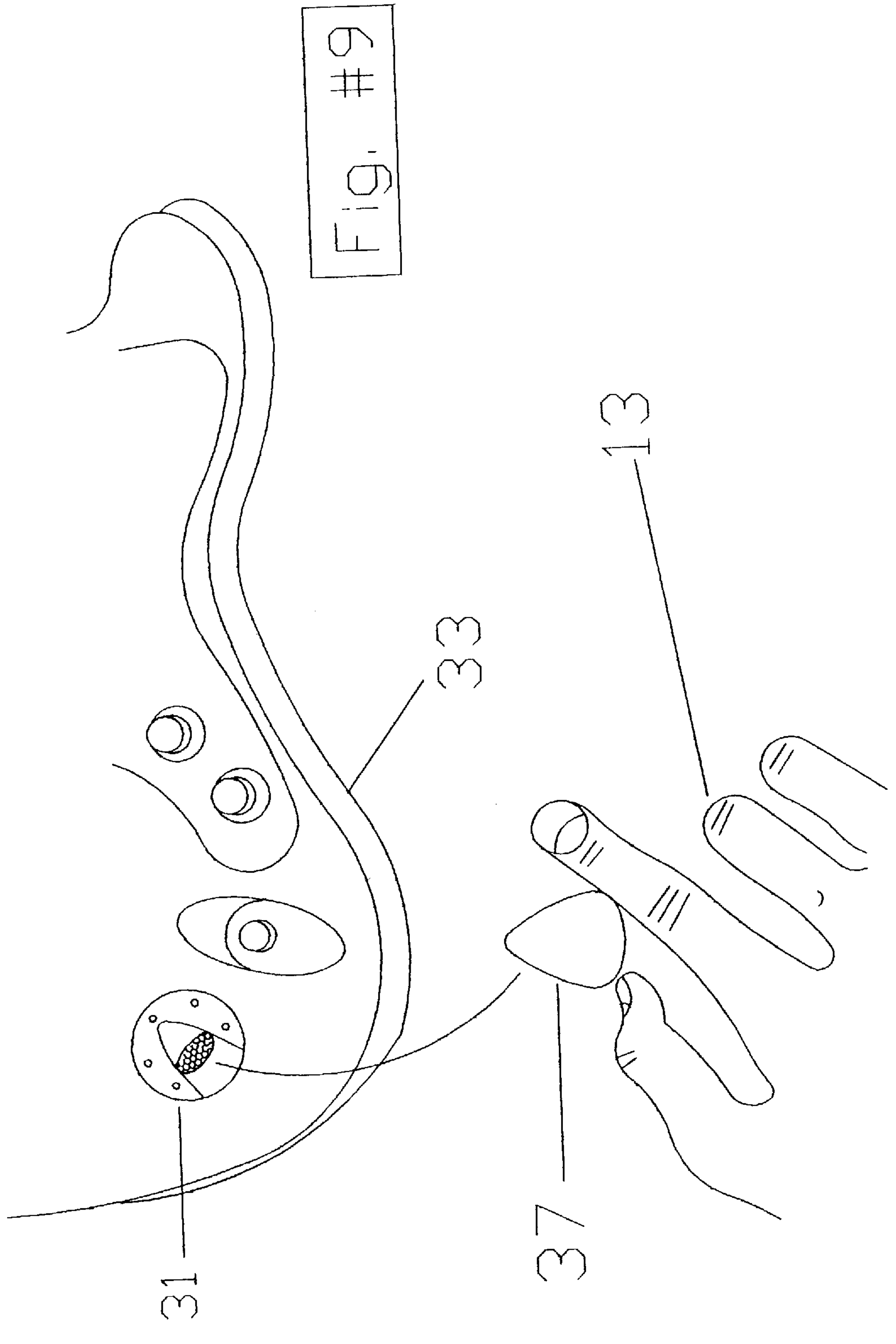

Fig.#10
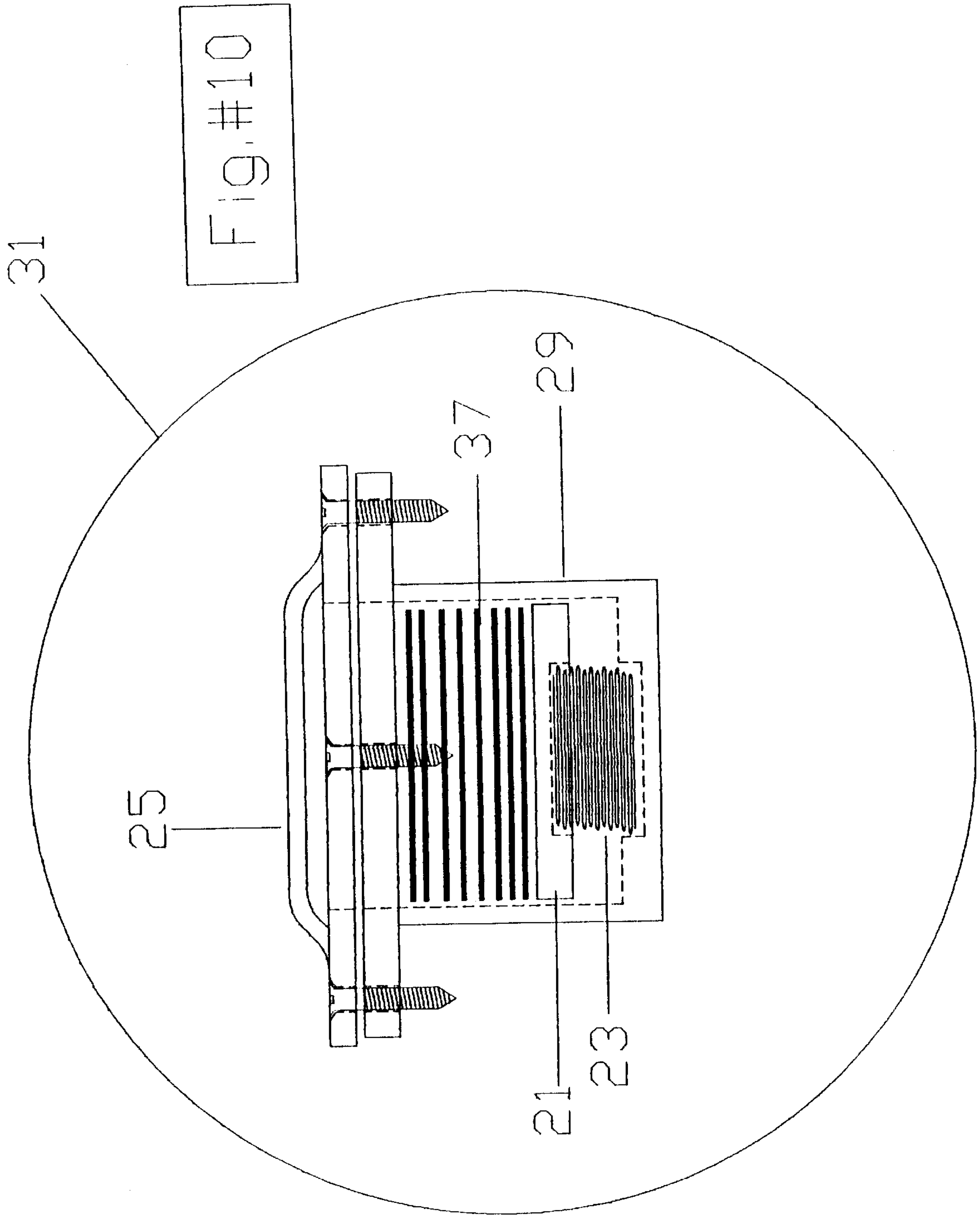

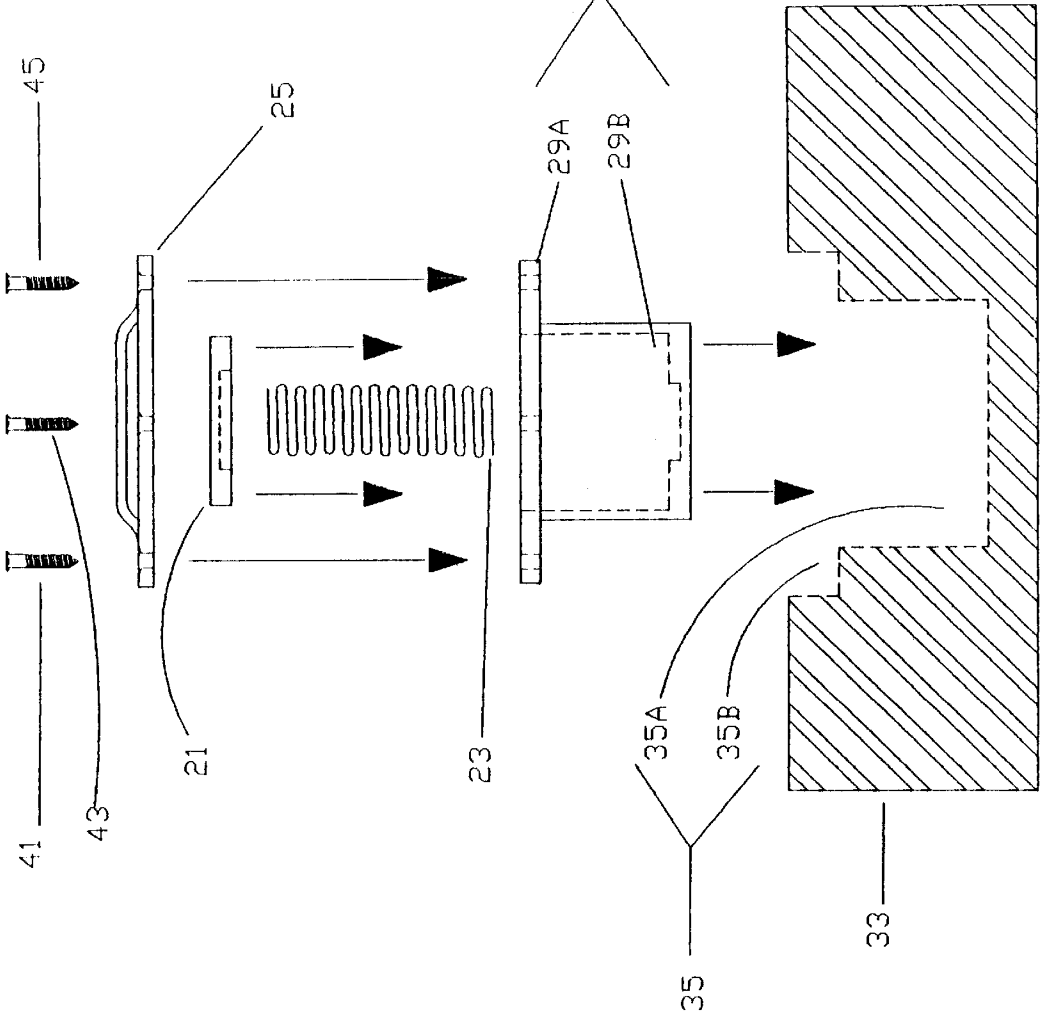
Fig.#11

Fig #12
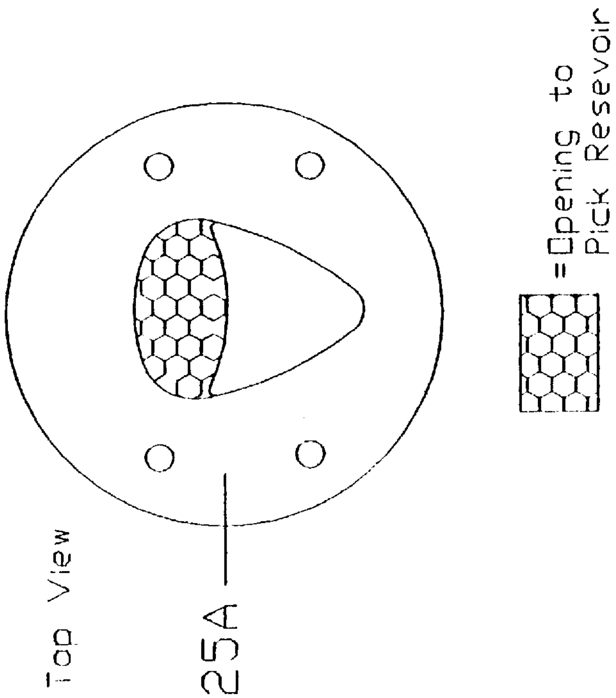

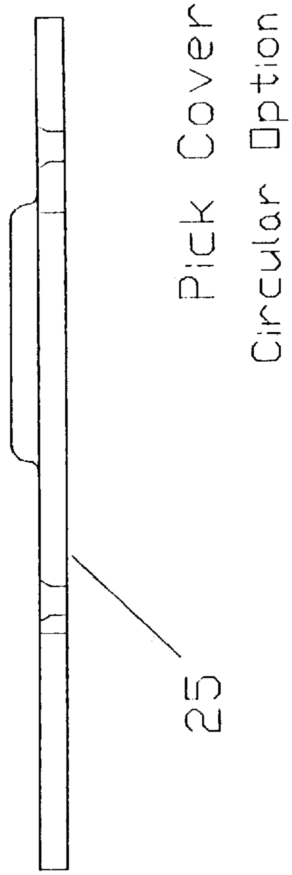
Fig #13

SELF-CONTAINED PICK DISPENSER

This invention is in the field of solid body stringed instruments which are plucked or strummed with "picks" such as a solid body electric guitar. More particularly this invention relates to a unique self contained pick dispenser which is installed into cavities in the bodies of such stringed instruments so that the picks are readily available and easily accessible.

BACKGROUND OF THE INVENTION

Stringed instruments have been around for quite some time. The earliest stringed instruments used strings made mostly from cat gut. The fact that this is a natural material and that the music of the time was plucked and not played very loudly, the performer's fingers were a sufficient implement for which to strike the strings. However, when music and technology advanced and the strings on these instruments are now being made of spun wire and the music played is strummed quite vigorously, a pick is used as an implement to strike the strings. A "pick" is a thin wafer-like, triangular shaped spatula, made of a hard but flexible material such as plastic. The musician holds the wider base of the triangularly shaped pick and strikes the string or strings with the exposed peak of the pick. Since the invention of the guitar pick, they have always been getting broken, lost and dropped by the performers in the middle of their performance. Leaving the musician:

1. to finish the song with their fingers (not getting the sound that they had originally planned).

2. to hunt for a pick in their pockets, amplifier, from a roadie etc., while the guitar portion of the song is left not played.

3. to tape picks to their guitars with two sided tape which is not very good for the finish of the guitar and leaves the performers fingers a little sticky.

4. to put picks on their microphone stands with pick holding attachments. These are a very good idea for guitarist that sing and are always near the microphone stand. Many performers that play guitar do not sing or are not always near the microphone stand when doing guitar solos. Some of today's performers do not use traditional microphones with stands, they prefer to use a headset microphone. The way the technology is progressing that may become the rule rather than the exception. Most guitarist are not limited or confined to performing on the stage. With the relay systems and the technology of today they can roam a good distance from the stage area and still be picked-up by their equipment on stage. Where is a guitarist to find a pick at the other end of an arena or on a moving platform suspended in the middle of an arena in the dark with theatrical smoke all around him/her while in the middle of a guitar solo during their finale?

A few solutions to this problem have been to put pick holders on the microphone stands as mentioned above. There is also a carry around spring loaded pick dispenser that can be carried by the performer in his/her attire. U.S. Pat. No. 5,231,238 to Adams 1993 shows a pick dispenser that is built into solid bodied stringed instruments, using the guitar's or the instrument's solid body as an integral part of the dispenser itself. The problem with this type of dispenser that uses the instrument's body as part of it's structure, is that the large majority, if not all, of these instruments are made of wood, which when it is subjected to minor changes in moisture or temperature contracts or expands. Since the cavity in the instrument is being used as an integral part of the dispenser, it too will swell and contract with the wood, thereby rendering the dispenser useless. Since the Adam's dispenser uses part of the instrument as an integral part of their dispenser, the manufacturer of the final product (the solid body instrument), would have to meticulously router the cavity to within minute tolerances to accommodate the picks as well as assemble the various other parts of the dispenser into the cavity. That makes the Adam's dispenser prohibitively expensive to manufacture and install due to the work-hours and applied cost.

Our solution is a self contained pick dispenser that is also fitted into an instrument such as a guitar. Our self contained pick dispenser would make picks available while the instrument is in use, and yet be functional in all types of conditions and be economically feasible and plausible from a manufacturing, assembly, and installation point of view.

OBJECT AND ADVANTAGES

Accordingly, there are several objects and advantages to our invention. The main object of this invention is to have a self contained pick dispenser for solid body stringed instruments that when installed becomes part of the instrument.

Another object of this invention is to be able to manufacture the dispenser as a separate unit. That is to say that although this dispenser is designed to, and will eventually be installed and become part of the solid body instrument, it is a self functioning device outside of the stringed instrument. Therefore, it does not use the instrument as one of it's functioning parts (it does not rely on the cavity made in the instrument as functioning part of the dispenser), but is merely assembled to the stringed instrument.

Another object of this invention based on the previous object is to minimize manufacturing cost of the pick dispenser as well as the applied cost in final assembly to the stringed instrument. It is our contention that to assemble a self contained pick dispenser into a bored out cavity in an instrument would be more economically feasible and therefore more palatable to a manufacturer of the end product (a solid body stringed instrument). Heretofore, pick dispenser for solid body stringed instruments had to be assembled in a cavity in said instruments. The cavity had to be meticulously routered into the solid body instrument. In order for the picks to move smoothly in an up and down fashion within the cavity, not only would the cavity have to be consistent to a minute tolerance to allow the picks to move freely through the cavity, but the cavity's walls or sides would have to be free of nay inconsistencies. If for example the cavities were bored too small the picks would not fit or move freely, and if the cavities are given too much room or tolerance the picks may get cocked and jam in the cavity. Since the majority of the solid body instruments are constructed of wood, there are many natural properties that may effect the consistent function of the prior art. There are hidden knots holes and voids in wood and if the cavity is bored in or near these imperfections, it would cause a problem to the consistent function of the Adam's invention. It would also be a problem from a manufacturing prospective, either by having to:

- repair such imperfections so that a dispenser that uses the solid body as one it's parts would work. The dispenser part (the cavity) may have to be filled or sanded which could be a very time consuming and costly from a work-hour perspective.
- or by having to scrap the solid body because a dispenser that uses the solid body as one of it's parts wouldn't work with these imperfections. This could be very costly from a materials cost perspective.

Either scenario is a very wasteful and expensive one.

It is also our object to produce a self contained pick dispenser whose pick reservoir or housing would be made of a solid material, such as plastic, that would be consistent in manufacture (tolerances and surface smoothness). It would not contract or expand due to non-destructive moisture or temperature changes, thereby assuring a more consistent and reliable function. Heretofore, pick dispensers used a cavity routered or bored into the solid body instruments as a pick reservoir. Since most solid body instruments are made of wood, they would be subject to contraction and expansion due to minor temperature and moisture changes. Such physical changes in the wood would effect the shape of the cavity being used as an integral part of the dispenser thereby effecting the performance of the pick dispenser as describe in U.S. Pat. No. 5,231,238 to Adams 1993.

It is also our object to produce a self contained pick dispenser that could easily be retrofitted to existing "non-dispenserized" solid body stringed instruments without any specialized tools, jigs, and templates.

It is also our object to produce a pick dispenser that will make it easier to grasp the pick once it is out of the dispenser's reservoir by utilizing a ramp option on the outer cover of the pick dispenser. The ramp will elevate the pick thereby making it easier to grasp with one's thumb and forefinger. This would eliminate the need to slide the pick on the instrument's surface until it could be grasp at the nearest perpendicular edge, not unlike trying to pick up a dime on a flat surface.

Other objects, features, or advantages may be apparent from the drawings and descriptions.

THE PRIOR ART

The following U.S. Patents disclose various types of pick dispensing devices for stringed instruments.

Adams, U.S. Pat. No. 5,231,238 /1993

Ferguson, U.S. Pat. No. 4,135,431 /1979

BRIEF DESCRIPTION OF THE DRAWINGS

FIG. 1 is a top perspective view of a solid body stringed instrument showing a pick dispensing device of this invention disposed therein and a user removing a pick.

FIG. 2 is a partial, cross sectional view of a solid body stringed instrument (guitar) with one embodiment of this present invention mounted therein.

FIG. 3 is a cross sectional exploded view of one embodiment of this present invention.

FIG. 4 a is a cross sectional exploded view of an assembled embodiment of this present invention and a cavity in a solid body instrument.

FIG. 5 is a top view of the cover of the present invention with an elevating ramp.

FIG. 6 is a side view of the cover of the present invention with an elevating ramp.

FIG. 7 is a side and top view of the pick reservoir of the present invention.

FIG. 8 is a side and top view of the pick shaped pushing plate or platform and a side view of the spring of the present invention.

FIG. 9 is a partial perspective view of a pick being removed by user of a stringed instrument with an embodiment of the present invention therein.

FIG. 10 is a cross sectional view of an assembled embodiment of the present invention.

FIG. 11 is a cross sectional exploded view of an embodiment of the present invention and a solid body.

FIG. 12 is a top view of the cover of the present invention without an elevating ramp.

FIG. 13 is a side view of the cover of the present invention without an elevating ramp.

REFERENCE NUMERALS DRAWINGS

13 Hand of User
15 Stringed Instrument
21 Pick Plate
23 Spring
25 Pick Cover Plate
25A Pick Cover Plate Flat Section
25B Opening in Pick Cover Plate
27 Ramp on Pick Cover Plate
29 Pick Reservoir
29A Flange Section of the Pick Reservoir
29B Housing Cavity Section Pick Reservoir
31 Self Contained Pick Dispenser Assembly
33 Solid Body of Stringed Instrument
35 Cavity in Solid Body Stringed Instrument
35A Least Wide, Deeper Section of the Cavity
35B Wider, Less Deep Section of the Cavity
37 Pick
41,43,45 Fasteners

DETAILED DESCRIPTION OF THE PREFERRED FORMS

Drawings:

The following elements are given identifying numerals which will be used consistently throughout the various figures thereof. FIG. 1 delineates a solid body stringed instrument reference numeral 15 with a form of the present invention, a self contained pick dispenser assembly reference numeral 31 therein. FIG. 9 shows the same parts in a closer view with a pick reference numeral 37 being removed by user 13. Pick 37 is shown in place in assembly 31 and as a removed item by user 13.

FIGS. 2,3, and 4 shows the embodiment of the present invention in various positions. FIG. 2 indicates present invention 31 totally assembled and mounted into instrument's solid body 33. FIG. 3 shows present invention and it's elements in an exploded view without the instrument's body. FIG. 4 shows the present invention 31 assembled in an exploded view with solid body 33 and the cavity reference numeral 35. FIG. 4 also indicates the different sections of cavity 35, 35A which is deeper section with lesser diameter, 35B is section with larger diameter and lesser depth. FIG. 3 also shows that present invention includes a spring 23, a pick plate 21, a pick reservoir 29 and a pick cover plate 25. FIG. 3 & 7 show different sections of pick reservoir 29, the flange area reference numeral 29A and housing area reference numeral 29B. FIG. 10 shows assembled dispenser which includes spring 23 compressed between bottom of pick reservoir 29 and pick plate 21, included are picks 37 which are positioned between pick plate 21 and retained under compression by pick cover plate 25 when fasteners 41,43 & 45 are placed through pick cover plate 25 and fixedly attached to flange area 29A of pick reservoir 29. Pick cover plate 25 partially covers pick reservoir 29. Pick shaped opening 25B (shown in FIG. 5) sits directly over the corresponding pick shaped cavity 29B (as shown in top view of FIG. 7). As a pick 37 is removed as shown in FIGS. 1 & 9, another pick 37 is delivered to the surface of solid body 33 by the force of compressed spring 23 and is held in place by pick cover plate 25 until the time when another pick 37 is needed. FIG. 2 indicates how assembled dispenser is fitted into cavity 35 in solid body 33. FIG. 4 shows an exploded view of assembled dispenser 31 and solid body 33 with cavity 35 and it's sections, 35A & 35B. FIGS. 2,4, & 11 show how flange section 29A of pick reservoir 29 (shown in FIG. 7 ) will lay and fit into cavity section 35B in solid body 33 yet allow the remainder, pick reservoir housing 29B (also shown in FIG. 7) to be left suspended in the deeper section of cavity 35A. This section of cavity 35A is bored or routered larger than pick reservoir housing 29B section to easily accommodate above mentioned housing 29B. As shown in FIG. 10 the form of present invention is a self contained pre-assembled independent pick dispensing unit 31 and the final procedure is to fixedly attach said unit to solid body 33 of stringed instrument 15. This is done by simply placing pick dispenser assembly 31 into cavity 35 and anchoring it to body 33 as indicated in FIG. 2. FIGS. 2,3,4, & 11 indicate how the fasteners 41,43, & 45 go through holes in pick cover plate 25 and then are fixedly attached to flange section 29A of pick reservoir 29 and are then fixedly attached to solid body 33 in cavity section 35B. The fasteners holes in pick cover plate 25 are designed to match with fasteners holes of pick reservoir 29 when pick shaped opening 25B of pick cover plate 25 mirrors pick shaped cavity of pick shaped housing section 29B of pick reservoir 29. Cavity section 35B is bored to a depth equal to the thickness of flange section 29A of pick reservoir 29 plus the thickness of pick cover plate section 25A (as shown in FIGS. 5 & 12 ). This would bring the top surface of pick cover section 25A flush with the surface of solid body 33 as shown in FIG. 2.

It is understood that picks 37 are to be loaded into dispenser 31 by placing pick 37 through opening 25B in pick cover plate 25 on the exposed section of pick plate 21 and pushing pick 37 in and down. Additional picks 37 would be loaded in the same manner, one on top of the other until spring 23 is totally compressed and the pick reservoir 29 is full.

A pick 37 would be removed by pressing on the upper exposed surface of pick 37 with one's digit and sliding the pick 37 out of dispenser 31 as shown in FIGS. 1 & 9. FIGS. 5,6,12 & 13 show different variations of pick cover plate 25. FIGS. 5&6 indicate pick cover plate 25 and a ramp section reference numeral 27. As pick 37 is being removed from pick dispenser 31 it will slide on ramp section 27 of pick cover plate 25. Pick 37 would then be moved up ramp section 27 by the same motion, where it would be elevated by ramp 27 and made readily available to be pinched at the pick dispenser (usually between the thumb and forefinger). Ramp area 27 on the pick cover plate 25 eliminates the sliding of pick across the surface of stringed instrument to a perpendicular edge. This eliminates wear and tear on the instrument's surface. FIGS. 11 & 12 indicate a pick cover plate 25 without an elevating ramp.

The elements of dispenser 31 may be constructed of any suitable material know to the art.

Accordingly, the reader will see that the self contained pick dispenser of this invention can be used to easily obtain a pick and that it can be refilled and used repeatedly. Furthermore the self contained pick dispenser of this invention has the additional advantages in that:

It is a self functioning unit or assembly that does rely on the instrument that it is being installed or mounted in, to be an intricate and essential part for it's function.

It permits the manufacturer of the end product, the solid body stringed instrument, to install the self contained pick dispenser of the present invention with minimal investment for tooling.

It permits the manufacturers of the end product, the solid body stringed instrument to install the self contained pick dispenser of the present invention with a minimal amount of work-hour costs.

It provides the user of the end product, the instrument, with a self contained pick dispenser of the present invention with a pick on demand at the pick dispenser rather than at the peripheral edge of the instrument when using the pick cover plate with the elevating ramp option. This is due to the unique ramp area on the dispenser that elevates the pick for easy grasping.

There would be less wear and tear on the finish of the instrument when using the pick cover plate with he elevating ramp option because the pick would be available at the pick dispenser rather than having to slide the pick across the instrument's surface to the perpendicular or peripheral edge of the instrument.

It allows instrument dealers and instrument repair shops the ability to retrofit existing solid body instruments without major investments for tooling, jigs, and templates.

All the above reasons save the end user, the consumer, money.

Although the descriptions above contain many specifications, these should not be construed as a limiting scope of the invention but as merely providing preferred embodiments of this invention. For example, the self contained pick dispenser may have shapes and sizes other than the circular one described in the drawings, the amount of fasteners and their placement, the placement of the self contained pick dispenser on the instrument, etc. Thus the scope of this invention should be determined by the appended claims and their legal equivalents, rather than the examples given.

What is claimed:

1. A self contained pick dispensing device for a stringed instrument, said self contained pick dispensing device comprising:

a hollow reservoir having an open top, a solid bottom, sidewalls defining a pick shaped cavity extending perpendicularly outward from the solid bottom, and a flange extending laterally outward and around the pick shaped cavity of the reservoir;

a plate disposed within the pick shaped cavity of the reservoir;

a spring disposed within the pick shaped cavity of the reservoir between the plate and the solid bottom such as to convey picks in an upward movement when compressed between the solid bottom and the plate;

a cover with an opening; wherein the cover partially covers the pick shaped cavity of the reservoir;

said stringed instrument having a solid body with a cavity therein;

said reservoir disposed within said cavity of the solid body of the stringed instrument;

fasteners fixedly attaching the cover, the flange and musical instrument, thereby retaining the picks, the plate and the spring within the pick shaped cavity.

* * * * *